Patented Sept. 13, 1938

2,129,735

UNITED STATES PATENT OFFICE 2,129,735

HYDROFORMED SOLVENT COMPOSITION

Robert T. Haslam, Westfield, N. J., assignor to Standard-I. G. Company, a corporation of Delaware No Drawing. Application August 28, 1936, Serial No. 98,341

21 Claims. (Cl. 134—79)

The present invention relates to improved solvents and solvent compositions and more specifically comprises a synthetic hydroformed solvent derived from petroleum and liquid distillation or extraction products thereof and also comprises new coating compositions in which the improved solvent vehicle is incorporated. This application is a continuation of my prior applications Serial No. 583,703, filed December 29, 1931 and Serial No. 640,670, filed November 1, 1932, and relates especially to coating compositions containing the improved solvents. My invention will be fully understood from the following description of the method of manufacture and use of the improved solvents.

It is known that hydrocarbon oil distillates, such as those obtainable from petroleum, may be hydroformed by destructive hydrogenation at elevated temperatures and pressures to produce products essentially different from those produced by simple hydrogenation or even by destructive hydrogenation at lower temperatures. For example, the hydroformed products when used as motor fuels possess antiknocking characteristics to a much greater degree than shown by the original oils or by products of other types of hydrogenation. These hydroformed products are produced from hydrocarbon oil distillates such as burning oil and gas oil and in general from hydrocarbon oils of a boiling range including that of gasoline and extending up to about 650 to 700° F. or somewhat higher. These distillate oils are passed in vapor phase with free hydrogen over suitable catalysts at a pressure in excess of 20 atmospheres and preferably 50 to 200 atmospheres or higher and at a temperature above about 900° F. and preferably within the range of about 930 to 1050° F. with a suitable partial pressure of hydrogen and time of contact to secure a destructive hydrogenation without the formation of appreciable amounts of polymerized or coky material. The hydrogen supplied is preferably within the range of about 1,000 to 4,000 cubic feet per barrel of feed oil, the amount generally depending upon the gravity and boiling range of the charging stock. A greater proportion of hydrogen may be used with suitable variation in feed rate, temperature and pressure as is known in the art. The feed rate depends upon the reaction temperature, and other operating conditions such as the partial pressure of hydrogen and may be suitably about 1.5 to 4 volumes of oil per volume of catalyst filled reaction space per hour. The catalysts preferably comprise the oxides or sulfides of the metals of the VI group of elements with suitable promoters of the alkaline earth or earth oxides. Such catalysts are insensitive to sulfur poisoning and are suitably classified as sulfactive.

The product of such a destructive hydrogenation process possesses highly desirable solvent properties throughout its boiling range. Fractions of desired volatility of these hydroformed distillates may be generally used in vehicles for resins, varnish gums, drying oils and nitrocellulose in varnish lacquer and paint formulae wherever aromatic hydrocarbon solvents such as benzene, toluene, xylene, turpentine oils and high flash coal tar naphthas and the like are suitable, and may be substituted, either partially or entirely for such hydrocarbons. Other solvents, made by other processes, if substantially identical with the solvents made by the hydroforming process, may also be used in the present invention.

Fractions suitable for use in this invention include both the low-boiling relatively volatile fractions which evaporate readily from surfaces under atmospheric conditions and the difficultly volatile fractions which evaporate more slowly and are used for applications where temperatures above atmospheric are available for the drying or setting of the compositions. The still higher boiling fractions in the destructively hydrogenated product may be recycled in the hydrogenation process and converted into the lower boiling solvent fractions.

The lower limit for the boiling range of the hydroformed solvents for most commercial purposes is fixed preferably at about 122° F., as fractions boiling below this point are so volatile as to constitute explosion hazards during application of the lacquers, etc. in which they are used. The lower boiling fractions may also cause the lacquer to show brush marks or moisture blush and hence, although their solvent power is excellent, these fractions should be used either in small amounts or with considerable precautions.

As the relatively volatile fractions are used primarily in surface coating compositions such as lacquers, varnishes, paints and the like, from which the solvent should readily evaporate, higher boiling fractions which cause a greasy or very slow drying coat are preferably eliminated.

The fractions of relatively low volatility include those boiling above about 280 to 300° F. and up to about 550 to 600° F. and having a flash point above about 80 to 100° F. These fractions represent improved high flash solvents which may be used in substitution for high flash coal tar naphthas, turpentine, xylol, dipentene and the like, in preparing surface coating compositions. Examples of such coating compositions are enamels, varnishes, lacquers, paints and the like. The high flash hydroformed solvents are especially suitable for use in coating compositions for "force" or bake drying or for applications in exposure to direct sunlight.

The solvent power of the hydroformed solvents depends not only upon the operating conditions used in the destructive hydrogenation process but also to some extent upon the source of the hydrocarbon oils used as feed stocks. Operating conditions in the destructive hydrogenation process being equal, hydroformed solvents produced from California crudes possess higher solvent power for oxygenated hydrocarbons, such as pyroxylin or kauri gum, than corresponding solvents from Mid-Continent crudes, while solvents from naphthenic base crudes possess even higher solvent power. Cracked cycle gas oils, especially such oils from asphaltic or naphthenic base crudes, form desirable feed stocks. Extraction products such as those produced in refining oils with solvents having a selective solvent action for non-paraffinic hydrocarbons, such as phenol or liquid sulfur dioxide, are preferred feed stocks for the production of these solvents by destructive hydrogenation, and hydroformed solvents superior even to pure aromatic hydrocarbons such as toluene and xylene and to coal tar naphthas may thereby be produced. Hydroformed solvents prepared by destructive vapor phase hydrogenation under the operating conditions defined above, are far superior to the corresponding straight run or cracked naphthas from the same crudes. In addition to possessing superior solvent power, the hydroformed naphthas are hydrunsulfed during the destructive hydrogenation process and the sulfur content of even high sulfur oils is reduced below that at which bad effects on lead pigments and the like are noticed.

The following examples are illustrative of one method of preparing hydroformed solvents and of a few uses to which these improved solvents may be put, but my invention is not to be limited thereto.

*Example 1.*—Cracked cycle stock from a California crude is destructively hydrogenated over a sulfactive catalyst at a pressure of 3,000 pounds per square inch and an average catalyst temperature of 950° F. A fraction of the product having an end point of 392° F. is removed from the process and the higher boiling fractions are continuously recycled. The ratio of hydrogen to oil in the feed to the system is 2,200 cubic feet of hydrogen per 42-gallon barrel of oil. The specifications of the feed stock are as follows:

| | |
|---|---|
| Gravity, °A. P. I. | 25.9 |
| I. B. P., °F. | 342 |
| Percent at 374° F. | 3.0 |
| Percent at 400° F. | 9.0 |
| Percent at 420° F. | 16.5 |
| Percent at 460° F. | 31.0 |
| Percent at 500° F. | 68.0 |
| Percent at 550° F. | 91.0 |
| Percent at 600° F. | 97.0 |
| F. B. P., °F. | 602 |
| Sulfur _____percent | 0.554 |
| Aniline point °F. | 79 |

The specifications of the product are:

| | |
|---|---|
| Gravity, °A. P. I. | 43.4 |
| I. B. P., °F. | 140 |
| Percent at 158° F. | 2.0 |
| Percent at 212° F. | 19.5 |
| Percent at 284° F. | 56.0 |
| Percent at 356° F. | 69.5 |
| Percent at 374° F. | 95.0 |
| F. B. P., °F. | 392 |
| Refractive index at 20° C. | 1.4625 |
| Sulfur _____percent | 0.025 |
| Gum (porcelain dish)_____mgs | 3.0 |
| Color | +25 |
| Doctor and corrosion | Passes |
| Aniline point °F. | 39 |
| Dimethyl sulfate value_____percent | 31.5 |
| Kauri-butanol value | 57 |

The dimethyl sulfate absorption test is made by shaking 10 cc. of dimethyl sulfate with 10 cc. of the vehicle. The increase in volume of the dimethyl sulfate layer is expressed in per cent of the original volume of the vehicle. The dimethyl sulfate absorption value for hydrocarbon distillate vehicles prepared from petroleum by distillation, cracking or liquid phase hydrogenation varies between about 4 and 10%.

The kauri-butanol value is determined according to the method given in Gardner's "Physical and Chemical Examination of Paints, Varnishes and Colors." This value is the number of ccs. of the vehicle that produces a definite cloud point when added at 77° F. to 20 grams of a standard solution prepared by dissolving 100 grams of kauri gum in 500 grams of pure butanol. This value for petroleum oils not treated by the destructive hydrogenation process usually ranges from about 25 to 40.

A lacquer of the following composition is prepared using the above hydroformed solvent. The parts are by weight:

| | Parts |
|---|---|
| Nitrocellulose (½ sec.) | 15 |
| Ethyl alcohol | 40 |
| Hydroformed solvent | 40 |
| Butyl acetate | 80 |
| Butyl alcohol | 20 |
| Ethyl acetate | 9 |
| Castor oil | 1 |

The above formula gives a good lacquer with highly desirable drying and film characteristics. This lacquer compares favorably with a corresponding lacquer prepared by the same formula except that benzene is used in place of the hydroformed solvent. The benzene formula may be diluted with 2.46 times its weight of benzene before precipitation of nitro cellulose takes place. A considerably greater amount of hydroformed naphtha may be used in the above formula than the amount there shown, and the naphtha formula may be diluted with 1.7 times its weight of hydroformed naphtha without precipitation of nitro cellulose, giving the hydroformed naphtha a diluent power equal to 69.2% of that of benzene for this lacquer. Under similar conditions ordinary petroleum naphthas or "mineral turps" possess a diluent power of only about 40 to 50% of that of benzene.

The hydroformed solvent is also fractionated into three parts as follows:

1. Fraction boiling below 167° F.
2. Fraction boiling between 167° F. and 239° F.
3. Fraction boiling above 239° F.

Lacquers corresponding to the above formula are prepared with each of these fractions and are all satisfactory. No blushing takes place on application and drying of the lacquer even when using the lowest boiling fraction.

*Example 2.*—A cracked hydrocarbon distillate from a Mid-Continent crude is destructively hydrogenated under substantially the same conditions as those described in Example 1. The feed stock has a gravity of 37.8° A. P. I. and boils between 435 and 629° F. It contains 0.179% sulfur and has an aniline point of 159° F. The product has the following specification:

| | |
|---|---|
| Gravity, °A. P. I. | 54.9 |
| I. B. P., °F. | 118 |
| Percent at 158° F. | 7.0 |
| Percent at 212° F. | 33.5 |
| Percent at 284° F. | 68 |
| Percent at 356° F. | 93 |
| Percent at 374° F. | 97 |
| F. B. P., °F. | 388 |
| Refractive index at 20° C. | 1.4310 |
| Sulfur percent | 0.020 |
| Gum (porcelain dish) mgs. | 2.5 |
| Color | +27 |
| Doctor and corrosion | Passes |
| Aniline point, °F. | 91 |
| Kauri-butanol value | 41.7 |
| Dimethyl sulfate value percent | 16.5 |

This hydroformed solvent when used in the lacquer formula given in Example 1 also gives a good lacquer comparing favorably in all characteristics with the same lacquers made with benzene or the California hydroformed solvent.

*Example 3.*—A lacquer of the following composition is prepared using the hydroformed solvent of either Example 1 or Example 2, above. The parts are by weight:

| | Parts |
|---|---|
| Nitrocellulose (½ sec., wet with 30% denatured alcohol) | 20 |
| Ester gum | 10 |
| Hydroformed solvent | 44 |
| Dibutyl phthalate | 5 |
| Butyl alcohol | 8 |
| Ethyl acetate | 32 |
| Butyl acetate | 16 |

These lacquers are also satisfactory in all respects as compared with the same lacquers made with aromatic hydrocarbon solvents.

The toxicity of the above compositions is greatly decreased by the substitution of hydroformed solvents, which are substantially non-toxic, for the coal tar aromatic hydrocarbon solvents which are known to have toxic properties.

The odor of the hydroformed solvents is quite different from and much more pleasant than that of the coal tar hydrocarbons. The hydroformed solvents also have none of the irritating and smarting effects on the eyes which have made coal tar hydrocarbons so objectionable.

*Example 4.*—An especially suitable lacquer solvent may be prepared by destructively hydrogenating the oil fraction obtained by extracting burning oils with liquid sulfur dioxide. A hydroformed product obtained by this method has the following specifications:

| | |
|---|---|
| Gravity, °A. P. I. | 19.7 |
| I. B. P., °F. | 150 |
| F. B. P., °F. | 522 |
| Dimethyl sulfate value percent | 100 |
| Kauri-butanol value | 117.3 |

Hydroformed solvents of suitable boiling range may be readily prepared from this product by distillation, and possess greatly improved solvent properties over the hydroformed solvents already described, as indicated by the dimethyl sulfate and kauri-butanol values. Hydroformed solvents with kauri-butanol values even above 150 may be prepared by this method.

*Example 5.*—A varnish of the following composition is prepared using the hydroformed solvent described in Example 1. The parts are by weight:

| | Parts |
|---|---|
| Kauri gum | 80 |
| Rosin | 20 |
| Linseed oil | 116 |
| Tung oil (raw) | 40 |
| Lime | 2 |
| Lead oxide | 2.5 |
| Manganese acetate | 0.5 |
| Hydroformed solvent | 200 |

This varnish contains 40% by weight of volatile and 60% by weight of non-volatile material and is highly satisfactory. A similar varnish in which half of the hydroformed solvent is substituted by turpentine and a third in which turpentine entirely replaces the hydroformed solvent are both of no better quality than the first.

The following table indicates the superiority of the high flash hydroformed solvents over coal tar naphthas and other solvents of similar boiling range. The solvent power, as indicated by the kauri-butanol numbers, increases with increase in boiling point for the hydroformed solvents, while it decreases for the coal tar naphthas.

| Solvent | Flash, °F. | Boiling range, °F. | Kauri-butanol number |
|---|---|---|---|
| Hydroformed solvent #1 | 95 | 293–392 | 77.5 |
| Hydroformed solvent #2 | 136 | 365–419 | 80.3 |
| Hydroformed solvent #3 | 200 | 419–550 | 88.0 |
| Coal tar solvents: | | | |
| Commercial toluol | | 266–356 | 94.0 |
| Commercial xylol | | 268–285 | 82.7 |
| High flash naphtha | | 302–400 | 71.1 |
| Turpentine | 82 | 300–372 | 58 |
| Petroleum naphtha | | 311–413 | 29.8 |
| Edeleanu extract of pet. nap. | 112 | 318–438 | 59 |
| Edeleanu #2 | 150 | 406–542 | 61 |

There is no commercially available hydrocarbon solvent boiling above 420° F. with solvent properties even approaching those of the Hydroformed Solvent #3 of the above table. The hydroformed solvents boiling above about 420° F. and having kauri-butanol values above 60 to 80, accordingly represent an entirely new series of solvent products, the exact chemical compositions of which are unknown except in that they are composed of liquid hydrocarbons.

*Example 6.*—A petroleum kerosene or "water-white" fraction is extracted with liquid sulfur dioxide and the fraction of the extract boiling between 311 and 592° F. is used as feed stock for a destructive hydrogenation process. This extract fraction has a gravity of 31.7° A. P. I., an aniline sensibility point of 32° F. and a sulfur content of 0.640%. It is destructively hydrogenated over a sulfactive catalyst at a pressure of 3,000 pounds per square inch and an average catalyst temperature of 979° F. The product is treated with sulfuric acid, neutralized with caustic soda, washed with water, and then separated into the following fractions by distillation.

| Fraction | 1 | 2 | 3 |
|---|---|---|---|
| Gravity, °A. P. I. | 33.7 | 27.5 | 17.7 |
| Aniline point, °F. | 19 | 22 | 42 |
| Kauri-butanol number | 74 | 78 | 88 |
| Initial, °F. | 276 | 359 | 421 |
| 5% off, °F. | 300 | 370 | 436 |
| 50% off, °F. | 326 | 385 | 464 |
| 95% off, °F. | 378 | 426 | 543 |
| Final, °F. | 398 | 458 | 582 |

The hydroformed solvents may be used in varnish preparations generally, alone or in admixture with drying oils and with other suitable solvents for the gums and resins customarily used.

The following table indicates the solubility of a number of commercially available resins in ordinary petroleum naphthas, coal tar solvents, and the hydroformed solvents.

leum naphtha even after addition of 10% of butyl alcohol.

The solubility of blown castor oil, recommended for use in the lacquer industry to replace synthetic plasticizers, is also higher in the hydroformed solvents than in high flash coal tar naphthas. This is indicated in the following table showing comparative tolerances of blown castor oil solutions for petroleum naphtha thinner. The "tolerance" is determined by adding petroleum naphtha to a solution of ten parts by volume of blown castor oil (Bakers #15) in twenty parts of the solvent until a turbid solution results.

*Solubility of blown castor oil*

| Solvent | Solubility | Tolerance |
|---|---|---|
| Petroleum naphtha thinner | Insoluble | 0 |
| High flash coal tar naphtha | Soluble | 4 |
| Hydroformed solvent A | Do | 7 |
| Hydroformed solvent B | Do | 9 |
| Hydroformed solvent C | Do | 12 |
| Hydroformed solvent D | Do | 23 |

The hydroformed solvents may also be used in lacquer preparations in admixture with lacquer vehicles generally, such as those containing aliphatic alcohols, ketones, and fatty acid esters and are especially desirable when used with secondary amyl, secondary butyl and isopropyl alcohols and their acetic esters. Pyroxylin and the other cellulose derivatives, plasticizers, gums

| Solvent | Boiling range, °F. | Resin—Relative solubility in solvent | | | | | | | | |
|---|---|---|---|---|---|---|---|---|---|---|
| | | Damar, Batavia A/E | Rezyl #12 | Rezyl #14 | Rezyl #19 | Rezyl #1102 | Teglac #15 | Amberol F-7 | Amberol K-12-A | Amberol 801 |
| Hydroformed solvents: | | | | | | | | | | |
| Hyd. solv. A | 200–275 | | 120 | 4 | 70 | 28 | Sol. | 180 | 260 | 220 |
| Hyd. solv. B | 275–365 | Sol. | 200 | 4 | 98 | 50 | Sol. | Sol. | Sol. | Sol. |
| Hyd. solv. C | 365–419 | Sol. | 190 | 4 | 98 | 50 | Sol. | Sol. | Sol. | Sol. |
| Hyd. solv. D | 419–550 | Sol. | 300 | 30 | 132 | 60 | Sol. | Sol. | Sol. | Sol. |
| Pet. naphtha | 311–413 | 42 | 28 | 2 | 20 | 13 | 39 | 23 | 78 | 31 |
| Coal tar solvents: | | | | | | | | | | |
| Benzol | | Sol. | Sol. | 28 | Sol. | Sol. | Sol. | Sol. | Sol. | Sol. |
| Toluol | | Sol. | Sol. | 6 | Sol. | Sol. | Sol. | Sol. | Sol. | Sol. |
| High flash naptha | 302–400 | Sol. | 150 | 2 | 90 | 48 | Sol. | Sol. | 320 | 150 |
| (Base solvent for resin) | | | T | TA | T | T | A | T | A | T |

It is apparent from the above table that the hydroformed solvents are much better solvents for these resins than are the ordinary petroleum naphthas. The fractions of the hydroformed solvents boiling within and above the range of high flash coal tar naphtha are better resin solvents than this coal tar distillate solvent.

The "relative solubility" in the above table is expressed as the number of cubic centimeters of the solvent that can be added to 20 grams of a resin solution, containing 5 parts by weight of a base solvent to one part of resin, before a turbid solution results. The base solvent was butyl alcohol (A) in all cases except that toluol (T) or a mixture of toluol and butyl alcohol (TA) were used when butyl alcohol failed to dissolve the resin.

Certain of these resins are soluble in the hydroformed solvents alone. For example, 5 parts by weight of each of the hydroformed solvents A, B, C and D gives a clear solution with one part of the Teglac 15 or the Amberol F-7 resins. These same resins give a turbid solution or suspension in ordinary petroleum naphtha solutions containing 100 parts of naphtha and only ½ part of the resin. These resins are insoluble in the petroand resins, such as the synthetic and "modified" phthalic glycerides and phenol formaldehyde resins, dammar gums and others commonly known to the lacquer industry may be used with these vehicles in making lacquer compositions. For example, a satisfactory lacquer may be prepared with cellulose ether and a hydroformed solvent as the only constituent of the vehicle. The hydroformed solvents may also be used in homogeneous vehicles containing drying oils suitable for use alone and for admixture with pigments for the preparation of paints and enamels.

These new synthetic petroleum distillates therefore provide highly desirable petroleum vehicles of high solvent power for free use in coating compositions of very wide and diverse character.

The hydroformed solvents have been separated by distillation into a great number of fractions of very narrow boiling range and it has been found that all of these fractions show much greater dimethyl sulfate or kauri-butanol values than are shown by naphthas obtained by distillation, cracking, or other methods except destructive hydrogenation, from corresponding crudes. The fact that the improved solvent power exists throughout the boiling range of the hydroformed solvent and is not restricted to the boiling ranges corresponding to benzene, toluene or xylene indicates that these new solvents do not depend upon the presence of these aromatic compounds for their improved solvent characteristics.

This invention makes available a new type of synthetic solvent for preparing surface coating compositions and the like, and has the added advantage over coal tar solvents and pine oils that this solvent may be readily prepared in substantially unlimited quantity and at a much cheaper cost than that of competing solvents even approaching it in solvent power.

My invention is not to be limited to any illustrative examples nor to any theory regarding the solvent characteristics of the hydroformed product but only to the following claims in which I wish to claim all novelty as far as the prior art permits.

I claim:

1. A coating composition containing film-forming ingredients dissolved in a vehicle comprising a solvent prepared by destructive hydrogenation of a petroleum distillate in vapor phase at a temperature above about 900° F. and a pressure in excess of 20 atmospheres.

2. As a coating composition, a composition comprising non-volatile coating substances which are soluble in organic solvents incorporated in an organic vehicle comprising a hydroformed synthetic solvent prepared from a petroleum distillate by destructive hydrogenation in vapor phase at a temperature above about 900° F. and a pressure in excess of 20 atmospheres.

3. A coating composition comprising film-forming ingredients dissolved in a vehicle comprising a volatile hydrocarbon liquid, having a kauri-butanol value above 40, and prepared by destructive hydrogenation of a petroleum distillate in vapor phase at a temperature above about 900° F. and a pressure in excess of 20 atmospheres.

4. Composition according to claim 3, in which said petroleum distillate is a non-paraffinic concentrate derived from a petroleum oil by treatment with a solvent having a selective action between paraffinic and non-paraffinic components thereof.

5. Composition according to claim 3, in which said petroleum distillate is a non-paraffinic concentrate secured by extraction from a petroleum oil with liquid sulfur dioxide.

6. Composition according to claim 3, in which said volatile hydrocarbon liquid boils above about 122° F.

7. Composition according to claim 3, in which said solvent boils within the approximate limits of 275 and 365° F.

8. Composition according to claim 3, in which said solvent boils within the approximate limits of 365 and 419° F.

9. Composition according to claim 3, in which said solvent boils within the approximate limits of 419 and 550° F.

10. As a varnish, a composition comprising an organic substance of the class of gums and resins which are soluble in organic solvents, dissolved in an organic vehicle comprising a volatile hydrocarbon liquid prepared by destructive hydrogenation of a petroleum oil in vapor phase at a temperature above about 900° F. and a pressure in excess of 20 atmospheres.

11. As a varnish, a composition comprising an organic substance of the class of gums and resins which are soluble in organic solvents, dissolved in an organic vehicle comprising a hydrocarbon liquid having a kauri-butanol value above 40, boiling within the approximate range of 275 and 419° F. and prepared by destructive hydrogenation of a petroleum oil in vapor phase at a temperature above about 900° F. and a pressure in excess of 20 atmospheres.

12. As a baking varnish, a composition comprising a drying oil and a resin, dissolved in a vehicle comprising a volatile hydrocarbon liquid having a kauri-butanol value above 40 and having a flash point above about 80° F., prepared by destructive hydrogenation of a petroleum oil in vapor phase at a temperature above about 900° F. and a pressure in excess of 20 atmospheres.

13. A baking enamel comprising a drying oil and a resin dissolved in a vehicle comprising a solvent of low volatility, boiling within the approximate limits of 200 and 600° F. and prepared by destructive hydrogenation of a petroleum oil in vapor phase at a temperature above about 900° F. and a pressure in excess of 20 atmospheres.

14. As a lacquer, a composition comprising a solution of a soluble cellulose derivative in an organic vehicle, comprising a volatile hydrocarbon liquid, prepared by destructive hydrogenation of a petroleum oil in vapor phase at a temperature above about 900° F. and a pressure in excess of 20 atmospheres.

15. As a lacquer, a composition comprising a solution containing a soluble cellulose derivative dissolved in an organic vehicle comprising a volatile hydrocarbon liquid, boiling within the approximate range of 200 and 275° F., having a kauri-butanol value above 40 and prepared by destructive hydrogenation of a petroleum oil in vapor phase at a temperature above about 900° F. and a pressure in excess of 20 atmospheres.

16. As a lacquer, a composition comprising pyroxylin dissolved in a vehicle comprising a volatile organic solvent for pyroxylin of the class of aliphatic alcohols and their fatty acid esters, and a volatile hydrocarbon liquid prepared by destructive hydrogenation of a petroleum oil in vapor phase at a temperature above about 900° F. and a pressure in excess of 20 atmospheres.

17. As a lacquer, a composition comprising a solution of cellulose ether in an organic vehicle comprising a volatile hydrocarbon liquid prepared by destructive hydrogenation of a petroleum oil in vapor phase at a temperature above about 900° F. and a pressure in excess of 20 atmospheres.

18. As a lacquer, a composition comprising a soluble cellulose derivative and blown castor oil dissolved in a vehicle comprising a volatile hydrocarbon liquid, having a kauri-butanol value above 40, boiling above about 122° F. and prepared by destructive hydrogenation of a petroleum oil in vapor phase at a temperature above about 900° F. and a pressure in excess of 20 atmospheres.

19. As a paint, a composition comprising a pigment admixed with an organic vehicle comprising a solution containing a drying oil and a volatile hydrocarbon liquid prepared by destructive hydrogenation of a petroleum oil in vapor phase at a temperature above about 900° F. and a pressure in excess of 20 atmospheres.

20. As a paint, a composition comprising a pigment admixed with an organic vehicle, comprising a solution containing a drying oil and a volatile hydrocarbon liquid, boiling within the approximate range of 365 and 550° F., having a kauri-butanol value above 40 and prepared by destructive hydrogenation of a petroleum oil in vapor phase at a temperature above about 900° F. and a pressure in excess of 20 atmospheres.

21. A coating composition comprising film-forming ingredients dissolved in a vehicle comprising a hydroformed volatile hydrocarbon liquid, having a kauri-butanol value above 40, and prepared by destructive hydrogenation of a petroleum distillate in vapor phase with a limited proportion of hydrogen under conditions suitable for forming anti-knocking motor fuels.

ROBERT T. HASLAM.